April 16, 1968 G. J. LOMER 3,378,632

DISTORTION REDUCING MODULATOR

Filed Sept. 22, 1964 3 Sheets-Sheet 2

United States Patent Office 3,378,632
Patented Apr. 16, 1968

3,378,632
DISTORTION REDUCING MODULATOR

Geoffrey John Lomer, Crowthorne, England, assignor to Electric & Musical Industries Limited, Hayes, England, a company of Great Britain Filed Sept. 22, 1964, Ser. No. 398,281
Claims priority, application Great Britain, Sept. 25, 1963, 37,645/63
7 Claims. (Cl. 178—5.4)

Figure 1:
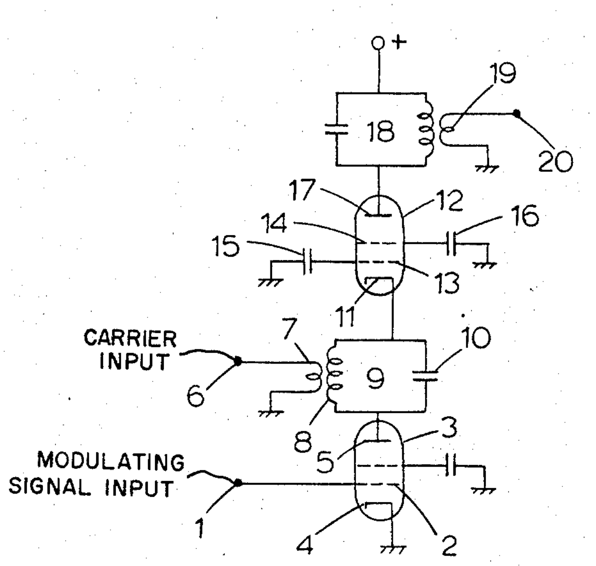

This invention relates to modulators, and especially to the kind employed for example in colour television transmitters, wherein both amplitude distortion and differential phase distortion must be made as small as possible.

In one kind of colour television transmission system the video signal is combined with a relatively high frequency sub-carrier, whose phase determines the hue of the resultant picture. For the purposes of transmission by radio the sub-carrier has to be modulated onto a high frequency carrier wave together with the video signal which may vary in amplitude between the limits representing white and black. If a modulated amplifier is employed for this purpose, the input impedance thereof will, in general, vary with the amplitude of the video signal. A sub-carrier whose phase is maintained momentarily constant, will consequently suffer a phase shift, during the process of modulation onto the carrier, which will alter in response to this change of input impedance in relation to the circuit shunt capacity.

If the phase of the sub-carrier after modulation onto the carrier together with a particular value of the video signal amplitude, for example peak white, is taken as a reference, then the difference between this phase and the sub-carrier phase at any other video signal amplitude, will be called the differential phase error at that other amplitude. The term differential phase distortion is used to describe the occurrence of such an error within the range of video modulation amplitudes.

Television video signals are commonly modulated onto a high frequency carrier wave by means of grid modulation techniques wherein the modulating signals are applied to the grid of the modulated amplifier. This type of modulator results in low differential phase distortion. It is however very difficult to achieve sufficient amplitude linearity for the exacting requirements of colour television transmission, even when considerable video pre-correction is employed.

Cathode modulation, wherein the modulating signals are applied to the cathode of the modulated amplifier, on the other hand allows good linearity to be readily obtained. It also permits the use of less expensive video circuits and power supply systems. However, serious differential phase errors are produced by reason of the wide variation of the cathode input impedance of the modulated amplifier.

It will be understood that although the terms grid and cathode modulation stem from the early forms of circuit employing thermionic valves, such modulators may equally well employ any suitable type of current controlling valve, of which the transistor and the field effect device are but examples. Such a valve will in general be provided with a current injection electrode which injects, into a control region, the carriers of an electric charge whose flow is to be controlled, a current collection electrode to collect this flow of electric charge carriers after control has been applied, and a control electrode whose function is to control the flow of electric charge carriers from the current injection electrode to the current collection electrode. The terms current injection electrode, current collection electrode and control electrode will be employed hereinafter in accordance with this description, and these terms represent the cathode, anode and grid or the emitter, collector and base in the case of a thermionic valve or a transistor respectively.

It is the object of the present invention to provide the circuit for a cathode driven modulator wherein the differential phase error is made small and is substantially reduced to a minimum.

According to the present invention there is provided a modulator circuit including a first and a second modulating device, each of said modulating devices being such that the impedance presented by said modulator by an applied modulating signal changes substantially in correspondence with the magnitude of the applied modulating signal, a source of modulating signal including a first signal component of varying amplitude and a second component comprising a sub-carrier oscillation the phase of which is significant additively combined therewith, a source of carrier signal, carrier feeding means for applying said carrier signal to said modulating devices, modulating signal feeding means for feeding said modulating signal to said modulating devices so that the respective carrier frequency outputs are amplitude modulated thereby in antiphase, output circuit means, output circuit feeding means for feeding the modulated carrier outputs of said respective modulators to said output circuit in which said modulated carrier output oscillations are added in antiphase relationship to provide an unbalanced carrier modulation, and control means for controlling the relative amplitudes of said modulating signals fed to said modulating devices, said control means being adjusted so that there is substantially cancellation in said output circuit of the differential phase shift of the modulated sub-carrier oscillation components of the outputs of the respective modulating devices.

According to a preferred form of the invention there is provided a modulating circuit including a first and a second thermionic valve each having a control grid a cathode and an anode, means for effectively grounding said respective control grids, a source of modulating signal said modulating signal including a first component of varying amplitude and a second component comprising a sub-carrier oscillation modulated in phase, additively combined therewith, signal feeding means for applying said modulating signal in opposite sense to said respective cathodes, a source of carrier signal, carrier feeding means for applying said carrier signal to said respective cathodes, output circuit means in which the modulated carrier outputs from said respective anodes are combined in antiphase to provide an unbalanced carrier modulation, and control means for controlling the relative amplitudes of said modulating signal fed to said respective cathodes, said control means being adjusted so that the change in phase of said sub-carrier as modulated on said carrier in response to a given variation in the amplitude of said first component is substantially cancelled in said output circuit.

Figure 2A:
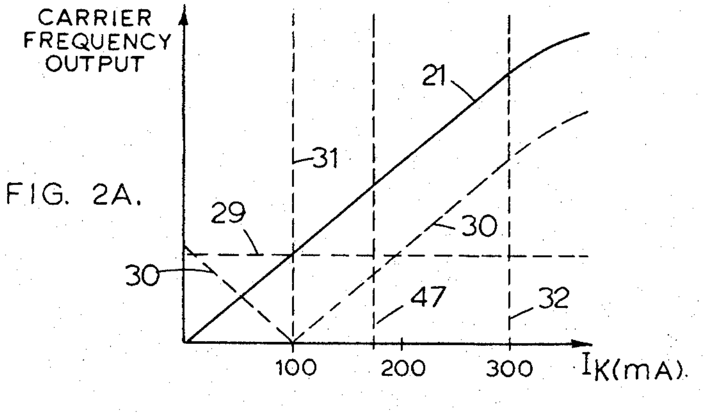
Figure 2B:
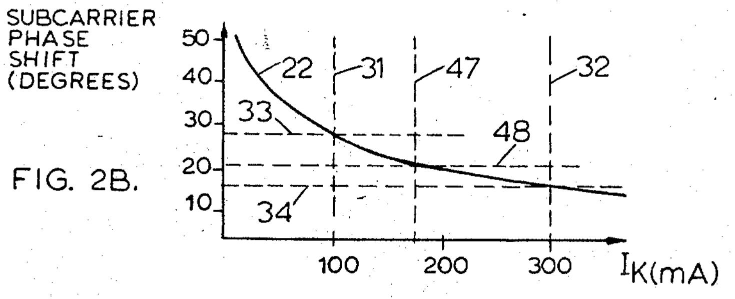
Figure 3:
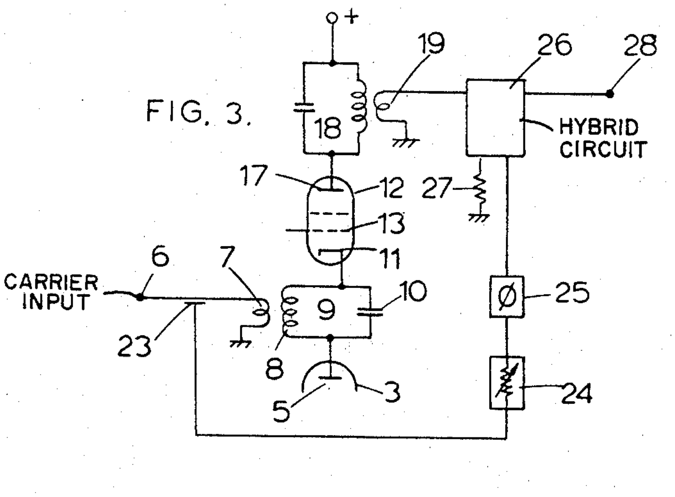
Figure 4:
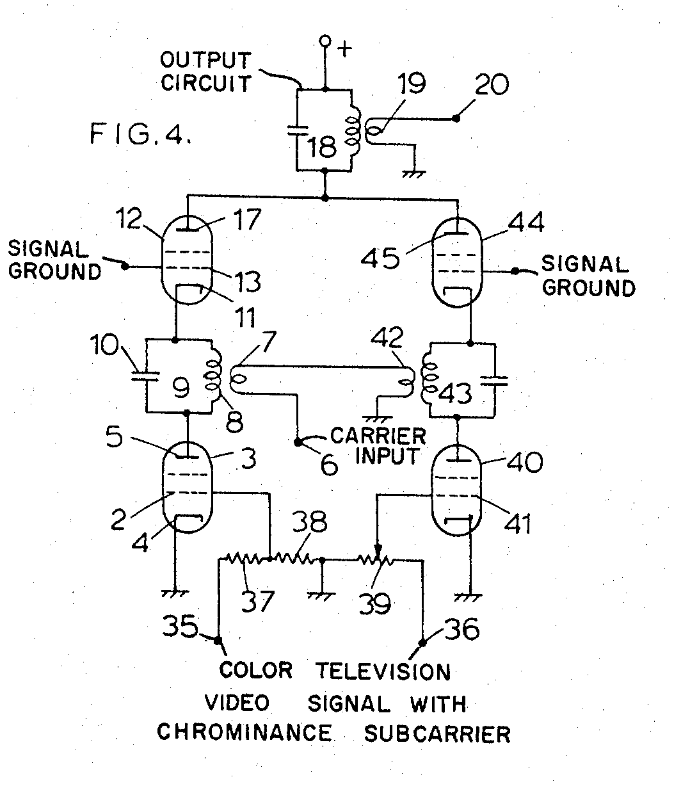

In order that the invention may be clearly understood and readily carried into effect, it will now be more fully described with reference to the accompanying drawings in which:

FIGURE 1 shows the circuit of a known form of cathode driven modulator,

FIGURE 2 shows graphs depicting the carrier frequency output and subcarrier phase shift as a function of the cathode current of the modulated amplifier valve shown in FIGURE 1, FIGURE 3 shows a development of the circuit shown in FIGURE 1, FIGURE 4 shows a circuit forming one embodiment of the invention, FIGURE 5 comprises vector diagrams illustrating the operation of the circuit of FIGURE 4, and FIGURE 6 contains graphs depicting the operation of FIGURE 4.

A common form of cathode modulating circuit is illustrated in FIGURE 1. The modulating signal is applied via terminal 1 to the grid 2 of the modulator valve 3. The cathode 4 is connected to the negative terminal of a power supply, which may be earthed. The high frequency carrier drive oscillation is applied via terminal 6 and coupling loop 7 to the inductive element 8 of the resonant circuit 9, tuned by capacitor 10. The resonant circuit 9 is connected at one side, to the anode 5 of modulator valve 3 and at the other side to the emitter 11, commonly called the cathode, of the modulated amplifying valve 12. The control electrode or grid 13 and the screening electrode 14 of valve 12 are fed with suitable biasing potentials but are effectively connected to earth at the frequencies of the modulating signal and the carrier oscillation by means of condensers 15 and 16. The collector or anode 17 is connected to the output resonant circuit 18 which is coupled to the output terminal 20 by inductance 19. It will be apparent that the resonant circuits 9 and 18 may be constructed in any convenient manner, and may take the form of tuned cavities or coaxial line circuits. The modulated carrier output from terminal 20 may be fed to subsequent amplifier stages as desired.

The performance of the modulator circuit shown in FIGURE 1 may be illustrated by means of the graphs shown in FIGURE 2. FIGURE 2A depicts the carrier frequency output amplitude of a modulated amplifier valve 12 of the type 4CX250K, as a function of the cathode current $I_K$. This relationship is indicated by the line 21. FIGURE 2B depicts the alteration in the phase shift of a high modulating frequency oscillation on passing through the modulator, as a function of the cathode current $I_K$. This relationship is indicated by the line 22. These measurements are made at a carrier frequency of 600 mc./s. It will be appreciated that it is the purpose of modulator valve 3 to vary the cathode current $I_K$ of the modulated amplifier valve 12 in exact response to the modulating signal applied to terminal 1.

The modulating signal will consist, in the case of a typical colour television transmission, of the video signal in combination with a high frequency modulating signal which forms the chrominance subcarrier. The average amplitude of the chrominance subcarrier will be small compared with the total range of video amplitudes extending from white to black, and may be of the order of 10 percent of this range. FIGURE 2B shows the phase shift of such a subcarrier whose amplitude and frequency are maintained constant. It has also been proposed that negative modulation be employed for the transmission of colour television signals. Peak white will therefore correspond to the minimum carrier amplitude. This is commonly set at 10 percent of the maximum carrier amplitude corresponding to the peaks of the synchronising pulses.

It will be seen from line 21 in FIGURE 2A that the carrier frequency output amplitude is linearly related to the modulating input, represented by the cathode current $I_K$, until the value indicated by line 32 is passed. The video modulation signal will preferably occupy this linear region and black may be represented by the level 32. A high degree of linearity is not required over the range occupied by the synchronising pulses which therefore lie to the right of line 32.

The subcarrier phase change corresponding to video black is indicated by the horizontal line 34 in FIGURE 2B. Taking this as a reference level, it will be seen that a video change from black to white will cause a differential phase error as great as 30 degrees. This would amount to a major change of hue in an N.T.S.C. type of colour system.

It has been proposed to reduce the differential phase distortion by the circuit arrangement illustrated in FIGURE 3. The operation of this circuit is identical to that shown in FIGURE 1, with the exception that a part of the carrier drive oscillation is extracted via the capacitive probe 23. From thence it is fed via an adjustable attenuator 24 and an adjustble phase shift network 25 to a hybrid 26. The output tuned circuit coupling 19 feeds another branch of hybrid 26. The resistor 27 forms the normal compensating load and the resultant output is taken from terminal 28.

By this means a fixed amount of unmodulated carrier output, represented on FIGURE 2A by the line 29, may be added in exact phase opposition to the output from the modulated amplifier 12. The modulator output becomes equal to this amount at a cathode current denoted by line 31. At this point the two oscillations cancel each other and the output at terminal 28 is reduced to zero. This level may now be caused to represent peak white. The resultant output from 28 is indicated in FIGURE 2A by the line 30.

The subcarrier phase change associated with peak white is now represented by the horizontal line 33 on FIGURE 2B. The differential phase error as between black and white has been reduced to about 13 degrees. This still represents a noticeable change of hue. It may be remarked that the error could be further reduced by raising the level 29 of the cancelling oscillation. This however, will result in a reduction in the available output power which depends on the swing in the cathode current between levels 31 and 32. It has not been found economical in practice to reduce the error much below 13 degrees by this method. The circuit of FIGURE 3 also suffers the disadvantage that it is prone to drift out of adjustment and is therefore troublesome to maintain.

It will be appreciated that these prior arrangements are unsatisfactory and it is the main aim of the present invention to reduce the differential phase error of a cathode driven modulator to a level acceptable for use in a colour television system. This desirable result is achieved following the invention, by employing two cathode driven modulators in a parallel circuit arrangement. The carrier frequency outputs are connected in phase opposition and the modulating signal is fed in push-pull relationship to the two modulators. The relative amplitudes of the modulating signals applied to the two modulators are adjusted according to the procedure to be described hereinafter, in order to reduce the differential phase distortion to a minimum over the video modulation range.

FIGURE 4 illustrates one embodiment of the invention in circuit form. It will be observed that the modulator valve 3 and the modulated amplifier valve 12 function in a manner similar to the corresponding valves shown in FIGURE 1. The modulator valve 40 and the modulated amplifier valve 44 also form a similar cathode driven modulator. The modulating signal is applied in push-pull relationship to terminals 35 and 36 which are connected to the resistances 37, 38 and to the potentiometers 39 respectively. The amount of modulating signal applied to the grid 2 of valve 3 is determined by the resistances 37 and 38 while that applied to the grid 41 of valve 40 may be adjusted by means of the slider on potentiometer 39. The carrier drive oscillation is applied via terminal 6 to coupling coils 7 and 42. The coils 7 and 42 are arranged to induce the drive oscillation into resonant circuits 9 and 43 in antiphase. The modulated carrier frequency outputs from anodes 17 and 45 of modulated amplifiers 12 and 44 are therefore in antiphase and are fed to resonant circuit 18 where one output will, in general, partially cancel the other.

If the same valve types are employed for amplifiers 12 and 44 and the same amount of drive is applied to each cathode, the output from 20 will become zero when the cathode currents are made equal. A suitable value for $I_K$ at this point is represented in FIGURE 2A by the line 47. This point is called the cross-over point. The valve 12 will then operate over the region of cathode current lying between 47 and 32 and valve 44 will operate between 47 and 31, when video signals are applied.

The effect of adding together the modulated carriers, to be referred to as A and B, which form the outputs from valves 12 and 44 respectively, is illustrated in FIGURE 5 by way of a vector representation. The output is made up by the carrier vectors $\overline{A}$ and $\overline{B}$ combined in antiphase and the two pairs of subcarrier sideband vectors $\overline{S}_A$ and $\overline{S}_B$. It will be observed that the sideband vectors, which are depicted at an instant in time corresponding to a particular arbitrary phase of the modulating subcarrier, are shown in push-pull modulation relationship with their respective carrier vectors. For the purposes of illustration the sideband vectors are shown exaggerated in amplitude by comparison with the carrier vectors. Only the subcarrier sidebands are shown, since the video modulation level is regarded as constant to simplify the explanation.

Figure 5A:
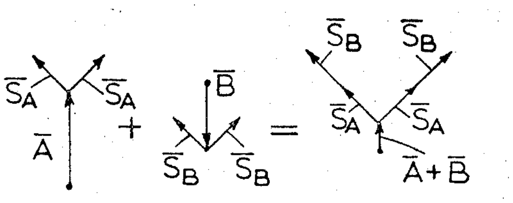
Figure 5B:
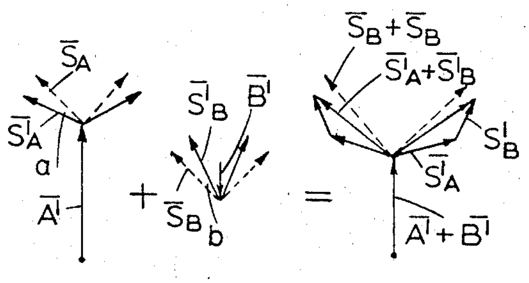

The situation pertaining to two different levels of video modulation are demonstrated in FIGURE 5. FIGURE 5A illustrates the vector addition at peak white level which is near the cross-over point, where the sub-carrier phase shifts due to valves 12 and 44 are approximately equal. FIGURE 5B illustrates the vector addition at a different video level. The carriers are here represented by $\overline{A}'$ and $\overline{B}'$ and the sidebands by $\overline{S}'_A$ and $\overline{S}'_B$. The sideband vectors $\overline{S}_A$ and $\overline{S}_B$ relating to the subcarrier phase at peak white level, are also known and make angles $a$ and $b$ to $\overline{S}'_A$ and $\overline{S}'_B$ respectively.

Figure 5C:
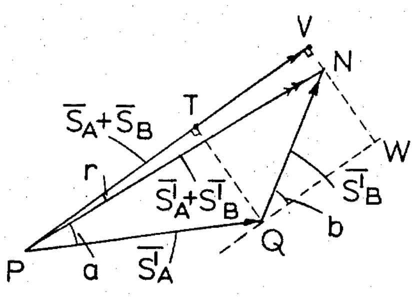

A more detailed illustration of the vector addition of the sidebands is given in FIGURE 5C and will now be referred to. The line PV represents the resultant sum of the sideband vectors $\overline{S}_A$ and $\overline{S}_B$. PQ represents the sideband vector $\overline{S}'_A$ making an angle $a$ with PV. QN represents the sideband vector $\overline{S}'_B$ making an angle $b$ with QW which is parallel to PV. Thus the resultant vector PN represents the vector sum of $\overline{S}'_A$ and $\overline{S}'_B$ and makes an angle $r$ with PV. Thus $r$ is the differential phase error at the video modulation level characterised by carrier vectors $\overline{A}'$ and $\overline{B}'$.

It will be assumed that the angles $a$, $b$ and $r$ are small such that sine $a$ approximates to $a$ and so on. Thus, if TQ is perpendicular to PV, the distance TQ is equal to the product $S'_A.a$. VW is perpendicular to PV and is therefore also equal to $S'_A.a$. NW is equal to $S'_B.b$. Hence VN is the sum of VW and NW, consequently $$r=\frac{VN}{PV}=\frac{S'_A\cdot a+S'_B\cdot B}{S_A+S_B}$$

It should be noted that the angle $b$ is negative. $S_A$, $S_B$, $S'_A$ and $S'_B$ are the scalar magnitudes of the vectors $\overline{S}_A$, $\overline{S}_B$, $\overline{S}'_A$ and $\overline{S}'_B$. $S'_A$ and $S'_B$ are equal to $S_A$ and $S_B$ respectively. Thus $$r=\frac{a+\frac{S_B}{S_A}\cdot b}{1+\frac{S_B}{S_A}} \qquad (1)$$

The differential phase error $r$ is here, by definition, zero at peak white. The angle $r$ may also be made zero at a second output level, situated for preferenec in the video region representing near black, by choosing the ratio of the amount of video drive applied to valves 3 and 40 and consequently the sideband ratio $S_B/S_A$, so that at this second point $$a+\frac{S_B}{S_A}\cdot b=0$$

or $$\frac{S_B}{S_A}=-\frac{a}{b} \qquad (2)$$

The differential phase error $r$ at any other level may then be determined from Equation 1 if the corresponding values of $a$ and $b$ are known.

Referring again to FIGURE 2, the sideband ratio $S_B/S_A$ is given by the difference in the current $I_K$ between the levels 31 and 47 divided by the difference in $I_K$ between the levels 47 and 32. The phase change $a$ is the difference between the phase shifts represented by 48 and 34, whilst $b$ is the difference between 33 and 48. Thus Equation 2 may be employed to determine the position of the cross-over point 47 by using the method of successive approximation until the ratio of phase differences equals the sideband ratio. Alternatively, the circuit of FIGURE 4 can be set up and the potentiometer 39 adjusted until the measured subcarrier phase shift is the same at the required black level as it is at peak white. It should be remarked that the best overall compromise in the variation in differential phase error is to be aimed at to suit the transmission. Thus the zero error reference level may be other than peak white so that the error fluctuations may be more favourably balanced about the zero value throughout the video range.

Figures 6A, 6B, 6C:
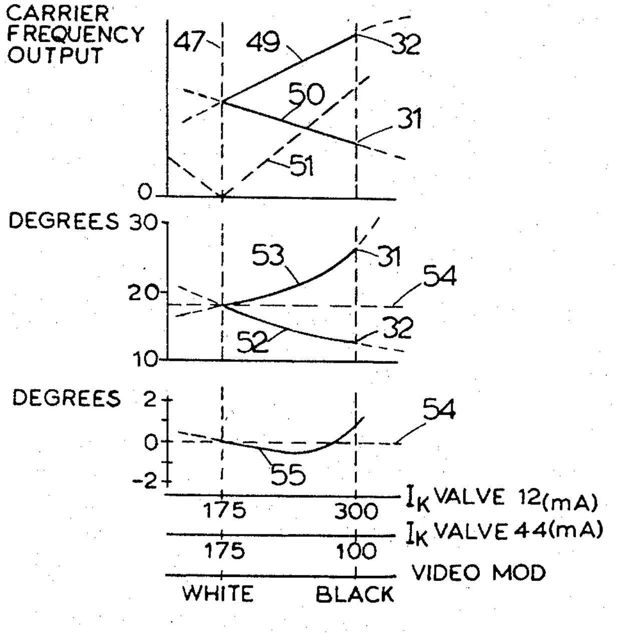

FIGURE 6 illustrates the operating ranges of the valves 12 and 44 which are derived from FIGURE 2. The antiphase carrier frequency outputs are shown by lines 49 and 50 respectively in FIGURE 6A and the resultant output is indicated by the line 51. FIGURE 6B shows the phase shift curves 52 and 53 for valves 12 and 44 respectively. The reference phase at peak white is given by the line 54. The differential phase error $r$ is then derived from the curves 52 and 53 by employing Equation 1. This error is shown in FIGURE 6C by the line 55 using line 54 as the reference axis. A sideband ratio $S_B/S_A$ of 0.6 is chosen as the best overall compromise for this levels may be other than peak white so that the error may be observed to be contained within the limits of approximately ±0.7 degree.

It should be noted that when a different valve type or a different circuit construction is employed, the optimum sideband ratio required to give the least differential phase distortion will, in general, be different from that quoted above. However, the most suitable value can readily be obtained from the corresponding measurements made on the circuit in question, by applying the principles hereinbefore described.

Although the invention has been described with reference to a particular circuit embodiment, it will be readily apparent that the invention may also be carried out in other ways. The carrier drive may for example be applied to each cathode in the same phase and the outputs from the modulators applied in push-pull to the output resonant circuit. In a further refinement the valve 44 may be of a different type with smaller power capabilities, since less output is required of this valve. This may require a different impedance match to be made to the output resonant circuit. The carrier frequency output and subcarrier phase shift curves will then, in general, be different. However by applying the principles herein set forth, the differential phase distortion may nevertheless be reduced to a minimum in accordance with the invention.

It should also be understood that while the invention has been disclosed in the form of an embodiment in which thermionic valves are employed, it is not intended to limit the scope of the invention to the use of thermionic valves, since the invention is readily applicable to circuits employing other forms of active elements of which transistors are but one example.

What I claim is:

1. A modulator circuit including a first and a second modulating device, each of said modulating devices being such that the impedance presented by said modulator to an applied modulating signal changes substantially in correspondence with the magnitude of the applied modulating signal, a source of modulating signal including a first signal component of varying amplitude and a second component comprising a sub-carrier oscillation the phase of which is significant additively combined therewith, a source of carrier signal, carrier feeding means for applying said carrier signal to said modulating devices, modulating signal feeding means for feeding said modulating signal to said modulating devices so that the respective carrier frequency outputs are amplitude modulated thereby in anti-phase, output circuit means, output circuit feeding means for feeding the modulated carrier outputs of said respective modulators to said output circuit in which said modulated carrier output oscillations are added in anti-phase relationship to provide an unbalanced carrier modulation, and control means for controlling the relative amplitudes of said modulating signals fed to said modulating devices, said control means being adjusted so that there is substantially cancellation in said output circuit of the differential phase shift of the modulated sub-carrier oscillation components of the outputs of the respective modulating devices.

2. A modulating circuit for colour television signals according to claim 1, in which the modulating signal comprises a luminance video waveform and a superimposed subcarrier wave modulated at least in phase with colour information.

3. A modulating circuit including a first and a second thermionic valve each having a control grid, a cathode and an anode, means for effectively grounding said respective control grids, a source of modulating signal, said modulating signal including a first component of varying amplitude and a second component comprising a sub-carrier oscillation, modulated in phase, additively combined therewith, signal feeding means for applying said modulating signal in opposite sense to said respective cathodes, a source of carrier signal, carrier feeding means for applying said carrier signal to said respective cathodes, output circuit means in which the modulated carrier outputs from said respective anodes are combined in antiphase to provide an unbalanced carrier modulation, and control means for controlling the relative amplitudes of said modulating signal fed to said respective cathodes, said control means being adjusted so that the change in phase of said sub-carrier as modulated on said carrier in response to a given variation in the amplitude of said first component is substantially cancelled in said output circuit when compared with that produced by a modulator employing only one of said thermionic valves.

4. A modulating circuit according to claim 3 in which said thermionic valve is a tetrode valve.

5. A modulating circuit according to claim 3, in which the carrier drive is applied to the said cathodes in anti-phase and the carrier frequency outputs from said anodes are fed to the same end of a common output tuned circuit.

6. A modulating circuit according to claim 3 in which two further thermionic valves are provided wherein the respective anodes of said further thermionic valves are connected to the respective cathodes of said first and second thermionic valves and said modulating signal is applied in antiphase to the respective control grids of said further thermionic valves.

7. A modulating circuit according to claim 3 in which said modulating signal is a colour television signal said first component being a luminance video waveform and said second component being a chrominance sub-carrier.

References Cited

UNITED STATES PATENTS

| | | | |
|---|---|---|---|
| 1,449,382 | 3/1923 | Carson | 325—49 X |
| 2,120,882 | 6/1938 | Ballantine | 332—44 X |
| 2,399,586 | 4/1946 | Toomim | 332—63 X |
| 2,824,172 | 2/1958 | Cherry | 332—49 X |
| 2,833,991 | 5/1958 | Karstad | 332—37 X |
| 2,960,669 | 11/1960 | Hofer | 332—63 |
| 3,202,939 | 8/1965 | Reiling | 332—43 |
| 2,775,738 | 12/1956 | Schesinger | 332—43 |

ROBERT L. GRIFFIN, *Primary Examiner.*

DAVID G. REDINBAUGH, JOHN W. CALDWELL, *Examiners.*

B. V. SAFOUREK, *Assistant Examiner.*